P. MacGAHAN.
ELECTRICAL DEVICE.
APPLICATION FILED MAY 25, 1914.

1,339,902.

Patented May 11, 1920.
2 SHEETS—SHEET 1.

WITNESSES:
R. J. Fitzgerald
J. H. Procter

INVENTOR
Paul MacGahan
BY
Wiley G. Carr
ATTORNEY

P. MacGAHAN.
ELECTRICAL DEVICE.
APPLICATION FILED MAY 25, 1914.

1,339,902.

Patented May 11, 1920.

WITNESSES:

INVENTOR
Paul MacGahan
BY
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL DEVICE.

1,339,902.  Specification of Letters Patent.  Patented May 11, 1920.

Application filed May 25, 1914. Serial No. 840,726.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Devices, of which the following is a specification.

My invention relates to electrical devices and particularly to contact-making measuring instruments.

The object of my invention is to provide a contact-making measuring instrument that shall have means for easily adjusting the contact members.

In practising my invention, I provide a contact-making measuring instrument having a movable cover. One of the coöperating contact members is secured to the cover and means is provided for securing the cover in predetermined position.

Figure 1:
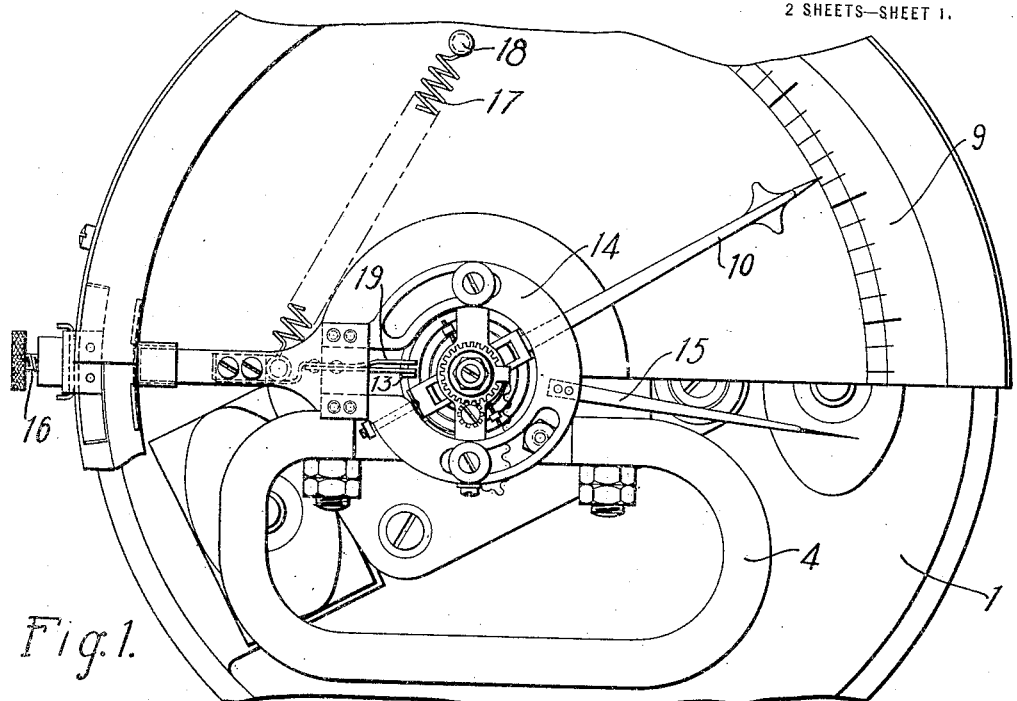
Figure 2:
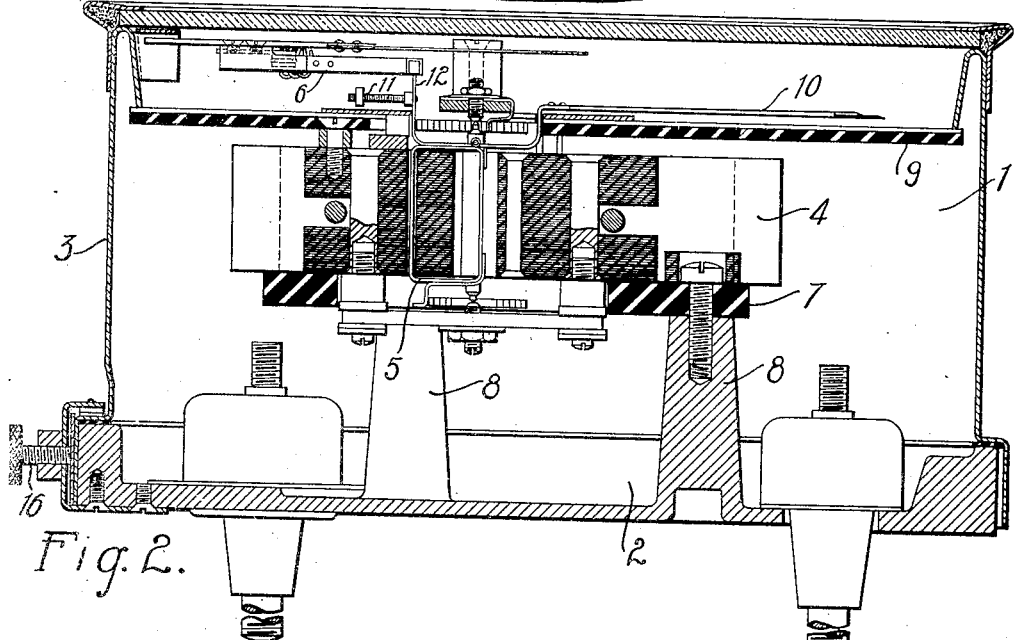
Figure 3:
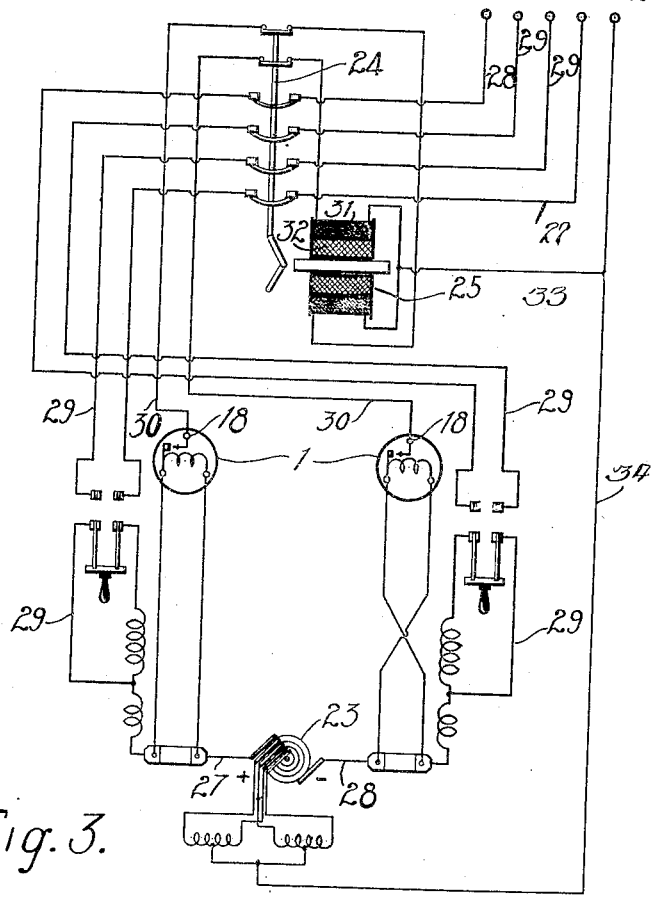

In the accompanying drawings, Figure 1 is a fragmentary plan view of a contact-making ammeter embodying my invention; Fig. 2 is a view, partially in elevation and partially in section, of the contact-making ammeter shown in Fig. 1; Fig. 3 is a diagrammatic view of circuits and apparatus embodying my invention, and Fig. 4 is a diagrammatic view of an electrical measuring instrument embodying my invention.

The contact-making ammeter 1 comprises a base member 2, a rotatable cover 3, permanent magnets 4, an armature 5 and a contact-making device 6. The permanent magnets 4 and the armature 5 are mounted upon a frame work 7 supported from the base member 2 by a plurality of projections 8. To the upper part of the frame work 7 is attached a dial 9, substantially as shown in the drawings. A pointer 10 is attached to the armature 5 at one side, and a counterbalance weight 11 is attached to the armature at the opposite side to counterbalance the effect of the pointer 10. A contact member 12 is attached to the armature 5 to form the movable member of the contact-making device 6 which comprises, besides the member 12, a resiliently mounted member 13, a supporting member 14 and a pointer 15. The supporting member 14 is attached to the cover 3 of the instrument and is so arranged that, when the cover 3 is rotated, the pointer 15 will indicate upon the scale 9 the value of the current at which the contact members 12 and 13 become engaged. A thumb screw 16 is provided for clamping the cover 3 in any desired position. A flexible conductor 17 connects a terminal 18 electrically to the supporting member 14. A stop 19 is provided upon the member 14 for limiting the relative movement of the resiliently mounted contact member 13.

Figure 4:
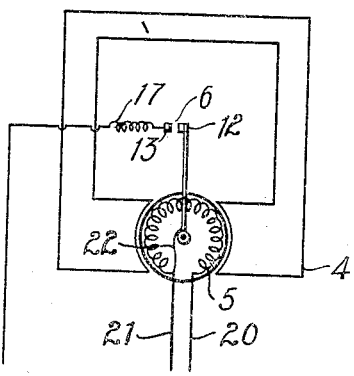

The two conductors 20 and 21, shown in Fig. 4 of the drawings, are the main flexible conductors of the armature 5. A flexible conductor 22 is provided for connecting one terminal of the armature 5 to the movable contact member 12 for reasons hereinafter set forth.

Since a contact-making ammeter is essentially an ammeter and a relay combined, the current at which the device is to operate must be predetermined. I have arranged my device so that, when the pointers 10 and 15 indicate the same reading on the scale 9, the contact members 12 and 13 will become engaged, and an electrical circuit will be completed through the contact members and the armature.

Referring particularly to Fig. 3 of the drawings, a three-wire generator 23 is protected by a six-pole circuit interrupter 24 which is tripped by a tripping device 25. The tripping device 25 is controlled by two contact-making ammeters embodying my invention. The armature windings of the contact-making ammeters are connected in a reverse order, since the currents traversing the main conductors 27 and 28 of the generator 23 are opposite in direction. A plurality of conductors 29 are connected from points between the series and commutating field-magnet windings of the generator 23 to the equalizing bus bars (not shown). Two conductors 30 are severally connected from respective terminals 18 of the ammeters to two poles of the circuit interrupter 24, and, from the circuit interrupter 24, to respective terminals of the trip coils 31 and 32 disposed upon the tripping device 25. The other terminals of the coils 31 and 32 are connected to a conductor 33, which is connected to the neutral conductor 34 of the generator. The conductors 27 and 28, as hereinbefore set forth, respectively form the positive and negative conductors of the three-wire system.

When the current traversing either of the conductors 27 and 28 rises to a predetermined value depending upon the setting of the pointer 15, the contact members will become engaged and a circuit will be established from one of the conductors of the generator 23, through the armature and the contact device of the contact-making ammeter, the conductor 30 and one of the coils of the tripping device 25, to a conductor 33 which is connected to the neutral conductor 34 of the three-wire system. The current which traverses this circuit will be in the same direction as the current that normally traverses the armature, and it will develop sufficient torque to maintain the engagement of the contact members until the circuit interrupter 24 has been tripped. After the circuit is interrupted, the springs (not shown) which are usually provided on a measuring instrument, will rotate the pointer and the movable contact member to the initial positions of the same, as will be understood by those versed in the art.

My invention may be applied to any of the well known types of electrical measuring instruments, such as voltmeters, ammeters or wattmeters of the plunger, induction, moving coil or moving iron types.

While I have described my invention in connection with apparatus of definite form of construction, I desire it to be understood that variations in size, form and construction, and means of operating the same may, of course, be made within the scope of the appended claims.

I claim as my invention:

1. In a contact-making device, the combination with a casing, a relatively movable cover therefor and an electro-responsive device disposed in the casing, of a contact member mounted on the cover of the casing, a coöperating contact member actuated by the electro-responsive device, and means for securing the cover of the casing in predetermined positions with respect to the casing.

2. In a contact-making device, the combination with a casing, a cover for the casing and an electro-responsive device disposed in the casing, of a contact member mounted on the cover of the casing, a coöperating contact member actuated by the electro-responsive device, and a thumb-screw for securing the cover in predetermined positions.

3. The combination with a casing, a relatively movable cover therefor and an actuating device in the casing, of a contact member mounted on the cover of the casing, a coöperating contact member operatively connected to the actuating device, means for permitting movement of the cover with respect to the casing, and a thumb-screw for securing the cover in predetermined positions.

In testimony whereof I have hereunto subscribed my name this 19th day of May, 1914.

PAUL MacGAHAN.

Witnesses:
 HAROLD B. TAYLOR,
 B. B. HINES.